US012287824B2

(12) United States Patent
Yang et al.

(10) Patent No.: US 12,287,824 B2
(45) Date of Patent: *Apr. 29, 2025

(54) SYSTEM AND METHOD FOR DETERMINING ITEM LABELS BASED ON ITEM IMAGES

(71) Applicant: Walmart Apollo, LLC, Bentonville, AR (US)

(72) Inventors: Binwei Yang, Milpitas, CA (US); Cun Mu, Jersey City, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,447

(22) Filed: Apr. 22, 2024

(65) Prior Publication Data

US 2024/0273133 A1 Aug. 15, 2024

Related U.S. Application Data

(63) Continuation of application No. 17/174,662, filed on Feb. 12, 2021, now Pat. No. 11,966,434.

(51) Int. Cl.
*G06F 16/50* (2019.01)
*G06F 16/532* (2019.01)
(Continued)

(52) U.S. Cl.
CPC ............ *G06F 16/532* (2019.01); *G06F 16/55* (2019.01); *G06F 16/56* (2019.01); *G06F 16/953* (2019.01); *G06N 3/04* (2013.01); *G06N 3/08* (2013.01)

(58) Field of Classification Search
CPC ......... G06F 16/532; G06F 16/55; G06F 16/56
See application file for complete search history.

(56) References Cited

U.S. PATENT DOCUMENTS 9,104,968 B2   8/2015   Wang
9,311,644 B2   4/2016   Liu et al.
(Continued)

FOREIGN PATENT DOCUMENTS

CN   105701476   6/2016
CN   109145901   1/2019

OTHER PUBLICATIONS

He, et al., "Deep Residual Learning for Image Recognition," Proceedings of the IEEE Conference on Computer Vision and Pattern Recognition (2016), 12 pages, retrieved from https://arxiv.org/pdf/1512.03385.pdf, 2016. 2016.

(Continued)

*Primary Examiner* — Kristopher Andersen
(74) *Attorney, Agent, or Firm* — Bryan Cave Leighton Paisner LLP (57) ABSTRACT

A method including automatically determining, by a machine learning model trained based at least in part on sample items stored in a sample database, a query embedding vector for a query image of a query item. The method further can include determining, based on a respective embedding distance between the query image of the query item and a respective image of each of the sample items, neighboring items from among the sample items. The respective embedding distance can be calculated based on the query embedding vector for the query image and a respective embedding vector for the respective image of each of the sample items. Each of the sample items can include the respective image and at least one respective item label. The method also can include determining a respective normalized weight for each of the neighboring items based on the respective embedding distance between the query image and the respective image of the each of the neighboring items. The method additionally can include determining a query item label of the query item based on a (Continued)

weighted majority vote by the neighboring items via the respective normalized weight for the each of the neighboring items. The method further can include upon determining that the query item label of the query item is different from a first item label of the query item. storing the query item with the query item label in a product database. The method also can include selectively updating the sample items stored in the sample database from items in the product database. In addition, the method can include re-training the machine learning model based at least in part on the sample items in the sample database, as updated. Other embodiments are disclosed.

20 Claims, 5 Drawing Sheets

(51) Int. Cl.
    *G06F 16/55*         (2019.01)
    *G06F 16/56*         (2019.01)
    *G06F 16/953*       (2019.01)
    *G06N 3/04*          (2023.01)
    *G06N 3/08*          (2023.01)
    *G06F 16/90*         (2019.01)

(56) References Cited

U.S. PATENT DOCUMENTS

| | | |
|---|---|---|
| 10,726,060 B1 | 7/2020 | Dutta et al. |
| 10,783,167 B1 | 9/2020 | Dutta et al. |
| 2010/0177956 A1 | 7/2010 | Cooper et al. |
| 2021/0019343 A1 | 1/2021 | Singh et al. |
| 2021/0034657 A1 | 2/2021 | Kale et al. |

OTHER PUBLICATIONS

Huang, et al., "Densely Connected Convolutional Networks," Proceedings of the IEEE Conference on Computer Vision and Pattern Recognition (2017), 9 pages, retrieved from https://arxiv.org/pdf/1608.06993.pdf, 2017. 2017.

Tan, et al., "EfficientNet: Rethinking Model Scaling for Convolutional Neural Networks," International Conference on Machine Learning (2019), 11 pages, retrieved from https://arxiv.org/pdf/1905.11946.pdf, 2019. 2019.

Johnson, et al., "Billion-Scale Similarity Search with GPUs," IEEE Transactions on Big Data (2019), 12 pages, retrieved from https://arxiv.org/pdf/1702.08734.pdf, 2019. 2019.

Mu, et al., "Fast and Exact Nearest Neighbor Search in Hamming Space on Full-Text Search Engines," International Conference on Similarity Search and Applications (2019), 14 pages, retrieved from https://arxiv.org/pdf/1902.08498.pdf, 2019. 2019.

Yang, et al., "Visual Search at eBay," Proceedings of the SIGKDD International Conference on Knowledge Discovery and Data Mining (2017), 10 pages, retrieved from https://arxiv.org/abs/1706.03154, 2017. 2017.

Mu, et al., "Towards Practical Visual Search Engine Within Elasticsearch," SIGIR eCom (2018), 8 pages, retrieved from http://ceur-ws.org/Vol-2319/paper7.pdf, 2018. 2018.

Zhang, et al., "Visual Search at Alibaba," Proceedings of the 24th ACM SIGKDD International Conference on Knowledge Discovery & Data Mining (2018), 9 pages, retrieved from https://arxiv.org/pdf/2102.04674.pdf, 2018. 2018.

Li, et al., "The Design and Implementation of a Real Time Visual Search System on JD E-Commerce Platform," Proceedings of the 19th International Middleware Conference Industry (2018), 7 pages, retrieved from https://arxiv.org/pdf/1908.07389.pdf, 2018. 2018.

Deng, et al., "Imagenet: A Large-Scale Hierarchical Image Database," 2009 IEEE Conference on Computer Vision and Pattern Recognition (2009), 8 pages, retrieved from https://www-cs.stanford.edu/groups/vision/documents/ImageNet_CVPR2009.pdf, 2009. 2009.

410 Determining automatically a query embedding vector for a query image of a query item by a neural network model pre-trained based at least in part on sample items.

420 Determining neighboring items from among the sample items based on a respective embedding distance between the query image and a respective image of each of the neighboring items.

421 Using a k-nearest neighbors (K-NN) search engine to search for the neighboring items for the query item.

430 Determining a respective normalized weight for each of the neighboring items based on the respective embedding distance between the query image and the respective image of the each of the neighboring items.

440 Determining a query item label of the query item based on a weighted majority vote by the neighboring items via the respective normalized weight for the each of the neighboring items.

441 Tallying at least one respective weighted group vote from each group of one or more groups of the neighboring items by summing up the respective normalized weight for each of one or more respective items of the each group of the one or more groups.

442 Determining the query item label of the query item to be the at least one respective item label of the each of the one or more respective items of a wining group of the one or more groups based on the at least one respective weighted group vote from the wining group.

450 Transmitting an alert to a user to be displayed on a user interface executed on a user device for the user based at least in part on a designation error and/or a confidence level status.

SYSTEM AND METHOD FOR DETERMINING ITEM LABELS BASED ON ITEM IMAGES

CROSS-REFERENCE TO RELATED APPLICATIONS

This application is a continuation of U.S. patent application Ser. No. 17/174,662, filed Feb. 12, 2021. U.S. patent application Ser. No. 17/174,662 is incorporated herein by reference in its entirety.

TECHNICAL FIELD

This disclosure relates generally to a system and/or method for improving user search experience based at least in part on image classification for products in e-commerce.

BACKGROUND

Product searching is commonly used in e-commerce for users to easily find products with attributes that the users desire. Among other things, the accuracy and coverage of product attributes in the product catalog significantly affect user search experience. However, product attributes assigned manually or automatically by a computer system can sometimes be incorrect. In addition, the taxonomy of a product attribute may evolve over time. It thus can be desired to have a system and/or method for automatically flagging and/or fixing items with erroneous or outdated product attributes in the product catalog.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 1:
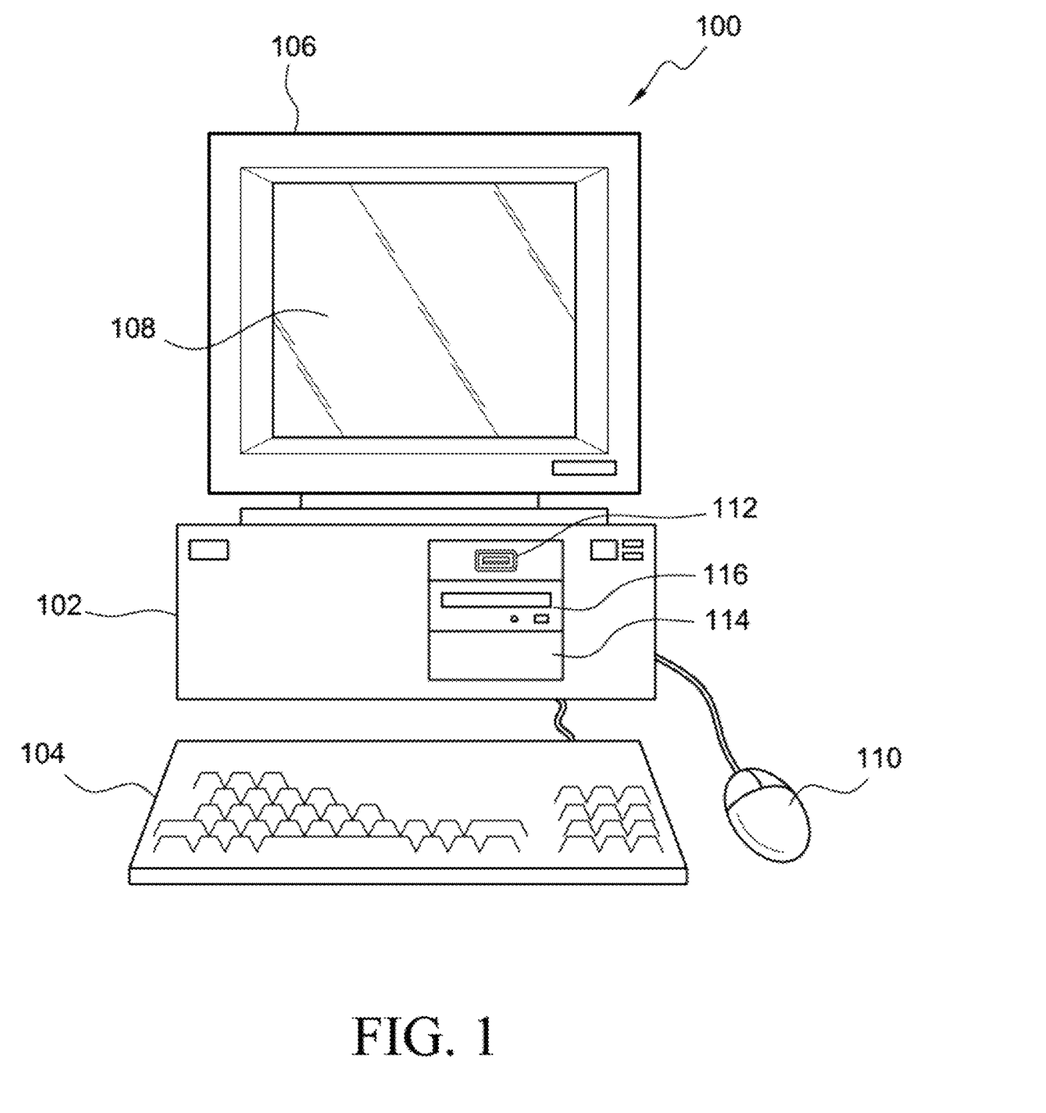
FIG. 1 illustrates a front elevational view of a computer system that is suitable for implementing an embodiment of the system disclosed in FIG. 3.
Figure 2:
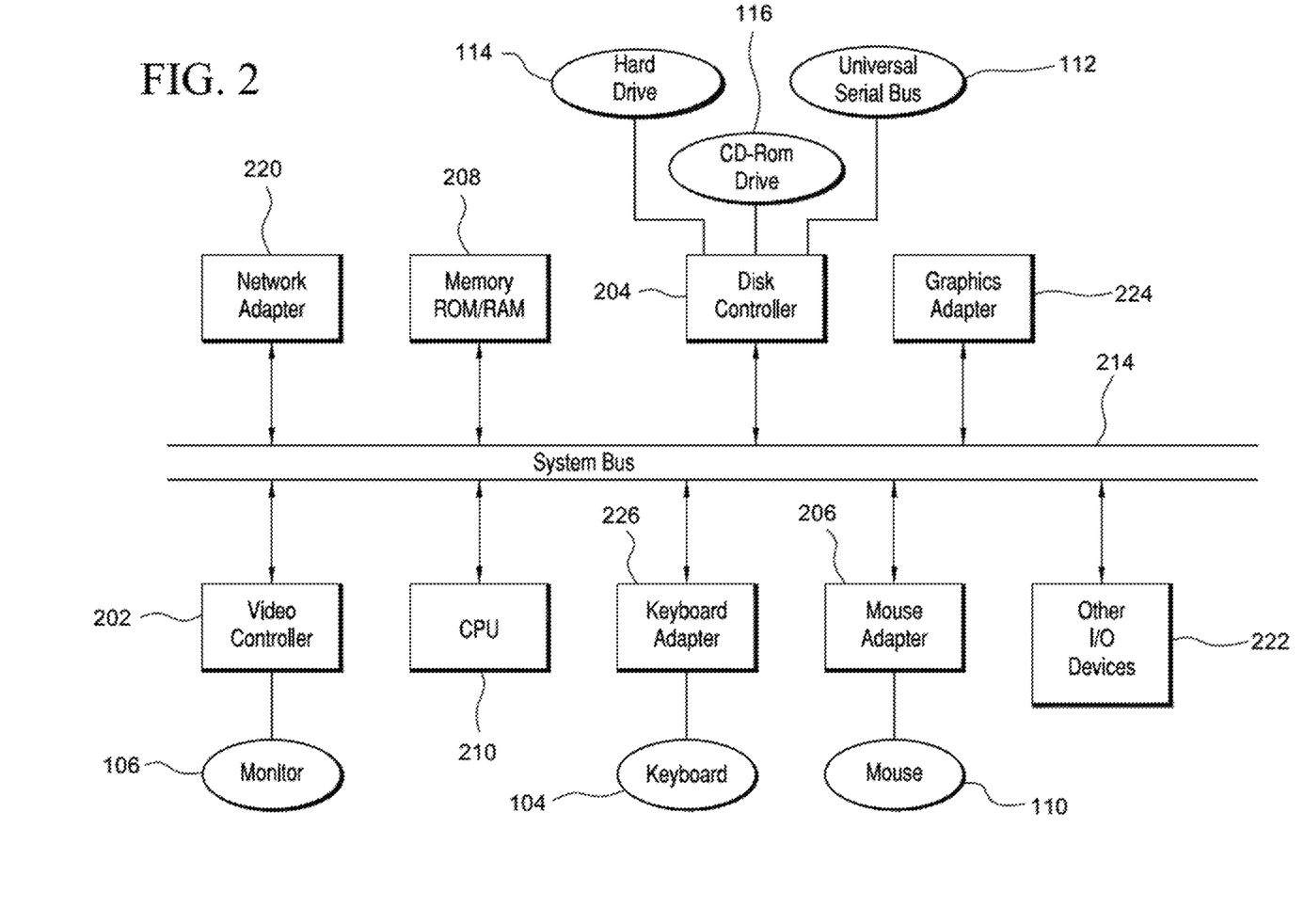
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
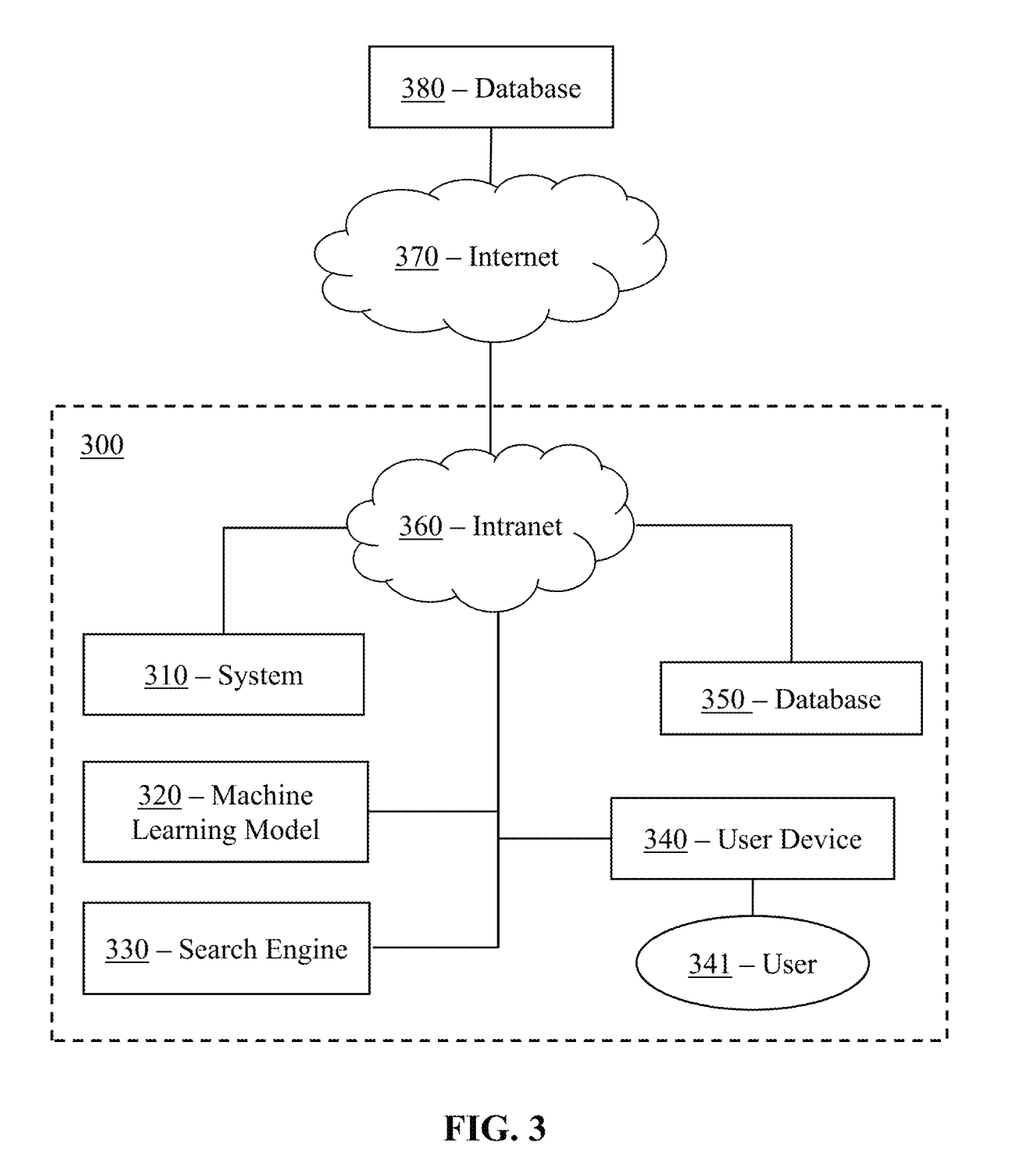
FIG. 3 illustrates a block diagram of a system that can be employed for determining an item label based on an item image, according to an embodiment.

Turning ahead in the drawings, FIG. 3 illustrates a block diagram of a system 300 that can be employed for determining an item label based on an item image, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, operators and/or administrators of system 300 can manage system 300, the processor(s) of system 300, and/or the memory storage unit(s) of system 300 using the input device(s) and/or display device(s) of system 300, or portions thereof in each case.

Referring to FIG. 3, in a number of embodiments, system 300 can include a system 310, a machine learning model 320, a search engine 330, a user device 340, and/or a database 350. System 310, machine learning model 320, search engine 330, and/or user device 340 can each be a computer system, such as computer system 100 (FIG. 1), as described above, and can each be a single computer, a single server, or a cluster or collection of computers or servers, or a cloud of computers or servers. In another embodiment, a single computer system can host system 310, machine learning model 320, search engine 330, and/or user device 340. In a few embodiments, system 310 can include machine learning model 320, search engine 330, user device 340, and/or database 350. Additional details regarding system 310, machine learning model 320, search engine 330, and/or user device 340 are described herein.

In some embodiments, system 310 can be in data communication with machine learning model 320, search engine 330, and/or user device 340 directly or using any suitable computer network, including Internet 370 or an internal network that is not open to the public (e.g., Intranet 360). Communication between system 310, machine learning model 320, search engine 330, and/or user device 340 can be implemented using any suitable manner of wired and/or wireless communication. Accordingly, system 300 can include any software and/or hardware components configured to implement the wired and/or wireless communication.

Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa.

In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Meanwhile, in many embodiments, system 310, machine learning model 320, search engine 330, and/or user device 340 also can be configured to communicate with and/or include one or more databases (e.g., database 350 and/or database 380). The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In certain embodiments, user devices (e.g., user device 340) can be desktop computers, laptop computers, a mobile device, and/or other endpoint devices used by users (e.g., user 341). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Still referring to FIG. 3, system 300 or system 310 can obtain a query image of a query item from user device 340, database 350, database 380, or a server not shown here (e.g., a back-end server or a front-end server for e-commerce), voluntarily or upon receiving a request via Intranet 360 or Internet 370 from user device 340 or the server. In some embodiments, after obtaining the query image, system 300 or system 310 can automatically determine, or have machine learning model 320 determine, a query embedding vector for the query image. In a number of embodiments, machine learning model 320 can include any suitable machine learning models and can be pre-trained in any suitable manner, including supervised, semi-supervised, and/or unsupervised. In many embodiments, machine learning model 320 can include a neural network model, such as ResNet (Residual Neural Network), DenseNet (Dense Convolutional Network), EfficientNet, or any other suitable convolutional neural networks, etc.

In some embodiments, machine learning model 320 can be pre-trained based at least in part on sample items. Each of the sample items can include a respective image, a respective embedding vector of the respective image, and/or a respective item label(s) (e.g., a product type tag, a department of an item, an item color, an item style, or any item attributes). Further, system 300, system 310, and/or machine learning model 320 can constantly or regularly collect and update the sample items from various sources, such as user device 340, database 350, database 380, ImageNet, or any other image databases.

In a number of embodiments, system 300 or system 310 can determine neighboring items that are visually similar to the query item from among the sample items based on a respective embedding distance between the query image and the respective image of each of the neighboring items. In many embodiments, system 300 or system 310 can have search engine 330 find the neighboring items from the sample items in a database indexed based on the respective embedding vector of each of the sample items (e.g., database 350). In some embodiments, search engine 330 and database 350 can be implemented based on any library suitable for nearest neighbors search (e.g., K-nearest neighbors (K-NN) search or approximate nearest neighbors (ANN) search) and vector indexing. Examples of such libraries include FAISS (Facebook AI Similarity Search), Annoy (Approximate Nearest Neighbors Oh Yeah), FENSHESE (Fast and Exact Nearest Neighbor Search in Hamming Space on Full-Text Search Engines), and NMSLIB (Non-Metric Space Library), etc.

In some embodiments, after the neighboring items are found, system 300 or system 310 further can determine a respective normalized weight for each of the neighboring items based on the respective embedding distance between the query image and the respective image of the each of the neighboring items. Then system 300 or system 310 can determine a query item label of the query item based on a weighted majority vote by the neighboring items via the respective normalized weight for the each of the neighboring items. In several embodiments where the query item is assigned an item label that is different from the query item label determined here, system 300 or system 310 further can transmit an alert to a user (e.g., user 341) to be displayed on a user interface executed on a user device (e.g., user device 340) for the user. In a few embodiments, system 300 or system 310 also can determine a confidence level status as to whether a confidence level for the query item label determined above is at least as great as a predetermined threshold (e.g., 80%, 85%, 95%, 99%, etc.). If the confidence level status shows that the confidence level is low, then system 300 or system 310 can decide not to transmit the alert to user 341.

Figure 4:
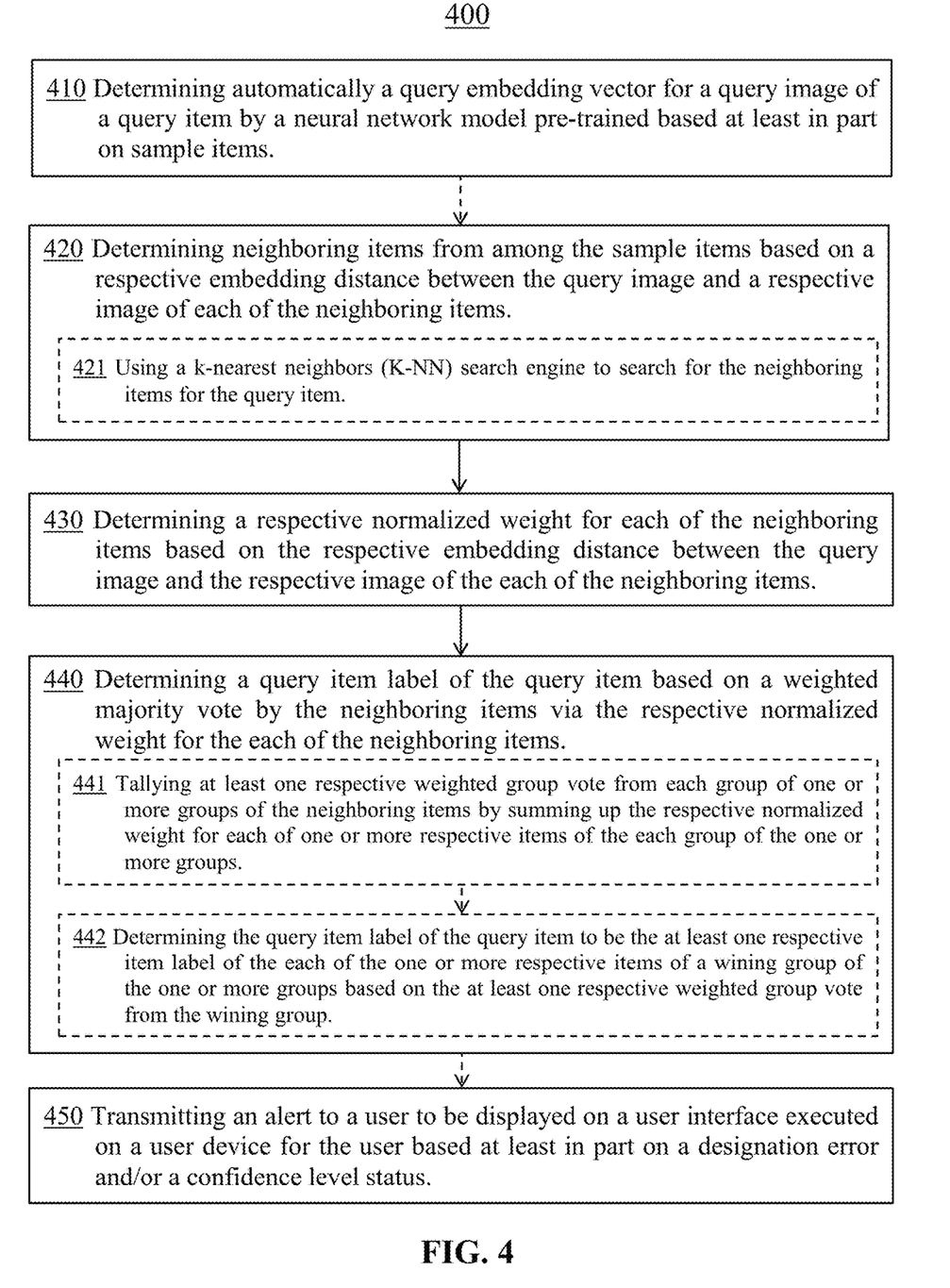
FIG. 4 illustrates a flow chart of a method, according to an embodiment.

Turning ahead in the drawings, FIG. 4 illustrates a flow chart for a method 400 of determining an item label of an item based on an item image, according to an embodiment. In certain embodiments, some or all of the procedures, the processes, and/or the activities of method 400 can be used by or with an e-commerce platform to automatically assign or propose to a user an item label for a new item to be added to a product database (e.g., database 350 (FIG. 3) or database 380 (FIG. 3)). In a few embodiments, some or all of the procedures, the processes, and/or the activities of method 400 can be used by or with a back-end system to automatically flag and/or fix items with problematic item labels (e.g., product type tags, style, color, etc.).

Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) or system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

In some embodiments, method 400 and the procedures, the processes, and/or the activities in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, in a number of embodiments, method 400 can include a block 410 of determining automatically a query embedding vector for a query image of a query item by a neural network model (e.g., machine learning model 320 (FIG. 3)) pre-trained based at least in part on sample items. In some embodiments, before determining the query embedding vector, block 410 can obtain the query image of the query item from a database (e.g., database 350 (FIG. 3) or database 380 (FIG. 3)) or receive the query image via a computer network (e.g., Intranet 360 (FIG. 3) or Internet 370 (FIG. 3)) from a user device (e.g., user device 340 (FIG. 3)) or a remote server.

In many embodiments, method 400 or block 410 further can include before determining the query embedding vector, training the neural network model based at least in part on the respective image and the at least one respective item label of the each of the sample items. In some embodiments, the neural network model (e.g., machine learning model 320 (FIG. 3)) can be trained offline to generate an embedding vector for a new item image based on historical input data (e.g., the respective image and the at least one respective item label of each of the sample items) and historical output data (e.g., a respective embedding vector of the each of the sample items). Examples of such a neural network model can include ResNet, DenseNet, EfficientNet, VGG, and any other suitable convolutional neural networks with transfer learning.

In some embodiments, the sample items can be generated by the neural network model (e.g., machine learning model 320 (FIG. 3)), another system (e.g., system 300 (FIG. 3) or system 310 (FIG. 3)), and/or manually by a system operator or administrator (e.g., user 341 (FIG. 3)) via a user computer (e.g., user device 340 (FIG. 3)) and stored in a database (e.g., database 350 (FIG. 3) or database 380 (FIG. 3)). In certain embodiments, the model or system (e.g., system 300 (FIG. 3), system 310 (FIG. 3), or machine learning model 320 (FIG. 3)) for generating the sample items can be configured to automatically and selectively download or stream suitable labeled item images from various sources (e.g., ImageNet, electronic product catalogs, online magazines, or any other online publications or databases, etc.). In a number of embodiments, after new labeled item images are downloaded, a semantic embedding vector for each of the new labeled item images can be generated by a model or system (e.g., system 300 (FIG. 3), system 310 (FIG. 3), or machine learning model 320 (FIG. 3), if trained). Then, new sample items can be created based at least in part on the new item images, the respective labels, and the respective semantic embedding vectors generated here.

In a number of embodiments, method 400 additionally can include a block 420 of determining neighboring items from among the sample items based on a respective embedding distance between the query image and the respective image of each of the neighboring items. In many embodiments, the respective embedding distance between the query image and the respective image of the each of the neighboring items can be a Euclidean distance between the query embedding vector for the query image, as determined in block 410, and the respective embedding vector of the each of the neighboring items.

In some embodiments, block 420 further can include a block 421 of using a k-nearest neighbors (K-NN) search engine (e.g., search engine 330 (FIG. 3)) to search for the neighboring items for the query item. In many embodiments, block 421 can find any suitable number (e.g., 3, 5, 7, 9, 11, 13, 15, etc.) of the neighboring items from the sample items in a database indexed based on the respective embedding vector of each of the sample items. In some embodiments, the K-NN search engine (e.g., search engine 330 (FIG. 3)) and the database (e.g., database 350 (FIG. 3)) can be implemented based on any suitable algorithms or libraries for K-NN search and vector indexing, such as FAISS, Annoy, FENSHESE, and/or NMSLIB, etc.

In a number of embodiments, method 400 also can include a block 430 of determining a respective normalized weight for each of the neighboring items based on the respective embedding distance between the query image and the respective image of the each of the neighboring items. In many embodiments, block 430 can determine the respective normalized weight for each of the neighboring items based on any suitable equation so that a neighboring item that is closer to the query item (e.g., having a shorter respective embedding distance) would be associated with a greater respective normalized weight. In some embodiments, block 430 further can include calculating the respective normalized weight for each neighboring item by:

$$\frac{\exp(d_i)}{\Sigma_i \exp(d_i)}, \forall i \in [K]$$

where:
   $d_i$: a respective embedding distance between the query image and its i-th neighbor; and
   K: the neighboring items.

In several embodiments, method 400 further can include a block 440 of determining a query item label of the query item based on a weighted majority vote by the neighboring items via the respective normalized weight for the each of the neighboring items. Each of the neighboring items can be deemed to cast a weighted vote for the at least one respective item label of the each of the neighboring items. In several embodiments, block 440 can assign each of the neighboring items to a single group of one or more groups based on the at least one respective item label of the each of the neighboring items. After group assigning, the at least one respective item label of each of one or more respective items of each group of the one or more groups can be identical within the each group, and the each group can be associated with at least one respective group label that is identical to the at least one respective item label of the each of the one or more respective items. When the one or more groups include at least two groups, the at least one respective group label of a group of the one or more groups can be different from the at least one respective group label of any other group of the one or more groups.

In a number of embodiments, block 440 further can include a block 441 of tallying at least one respective weighted group vote from each group of the one or more groups of the neighboring items by summing up the respective normalized weight for each of the one or more respective items of the each group. In some embodiments, block 440 additionally can include a block 442 of determining the query item label of the query item to be the at least one respective item label of each of the one or more respective items of a wining group of the one or more groups based on the at least one respective weighted group vote from the wining group.

In a number of embodiments where the query item is assigned, manually or by a computer system, an assigned item label, method 400 additionally can include a block 450 of transmitting an alert to a user (e.g., user 341 (FIG. 3)) to be displayed on a user interface executed on a user device (e.g., user device 340 (FIG. 3)) for the user based at least in part on a designation error and/or a confidence level status. In many embodiments, block 450 further can include before transmitting the alert, determining a designation error based on whether the query item label of the query item, as determined in block 440, is different from the assigned item label of the query item. In several embodiments, block 450 also can include before transmitting the alert, determining a confidence level status based on whether a confidence level for the query item label is at least as great as a predetermined threshold (e.g., 0.75, 0.80, 0.85, 0.9, 0.98, etc.). In a number of embodiments, block 450 further can include determining the confidence level for the query item label based on the respective weighted group vote of the wining group, as determined in block 442. In some embodiments, when the designation error exists, block 450 can transmit the alert (e.g., an email, a SMS text message, a push notification, etc.) to the user. In certain embodiments, block 440 can transmit the alert to the user only when the confidence level status indicates that the confidence level for the query item label reaches or exceeds the predetermined threshold. Once the user receives the alert, the user can take any proper actions to respond to the designation error, such as correcting the assigned item label of the query item stored in a database (e.g., database 350 (FIG. 3) or database 380 (FIG. 3)), keeping a log, and/or ignoring the designation error.

In a few embodiments, when the query item label determined in block 440 is different from the assigned item label and the confidence level is high enough, block 440 also can include automatically correcting, or having a model, server, or system correct, the assigned item label of the query item by substituting the assigned item label with the query item label determined here.

Figure 5:
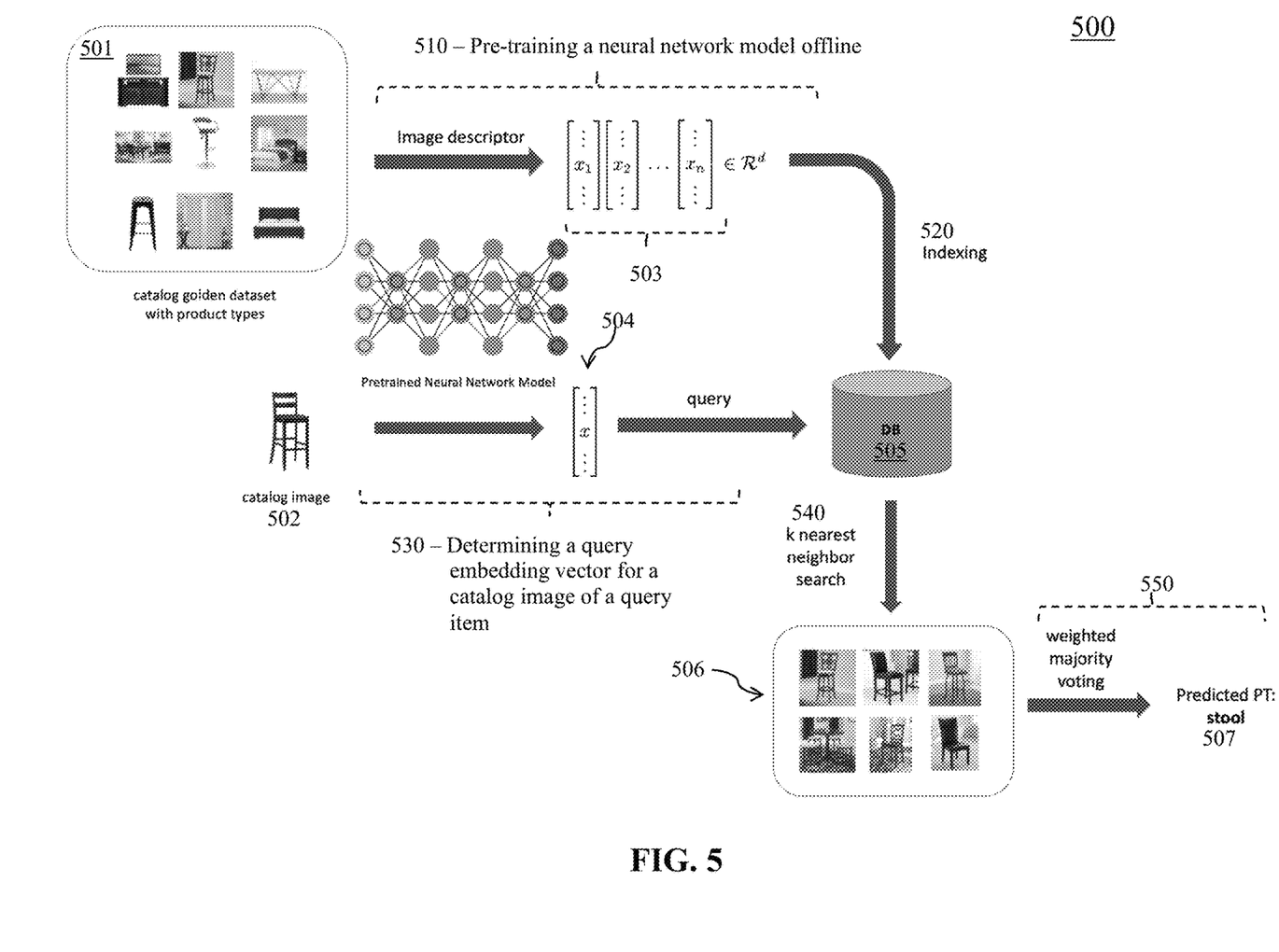
FIG. 5 illustrates a flow chart of a method, according to another embodiment.

Turning ahead in the drawings, FIG. 5 illustrates a flow chart for a method 500 of determining a product type of an item based on an item image, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In a number of embodiments, some or all of the procedures, the processes, and/or the activities of method 500 can be similar or identical to some or all of the procedures, the processes, and/or the activities of method 400 (FIG. 4).

In many embodiments, system 300 (FIG. 3) or system 310 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) or system 310 (FIG. 3). The processor(s) can be similar or identical to the processor(s) described above with respect to computer system 100 (FIG. 1).

In some embodiments, method 500 and the procedures, the processes, and/or the activities in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, in a number of embodiments, method 500 can include an activity 510 of pre-training a neural network model (e.g., machine learning model 320 (FIG. 3)) offline based at least in part on sample items in a catalog golden dataset (e.g., 501). The neural network model can be pre-trained to generate an embedding vector (e.g., 503) for an item image based on historical input data (e.g., a respective image and a respective product type of each of the sample items) and historical output data (e.g., a respective embedding vector of the each of the sample items). The neural network model can include ResNet, DenseNet, EfficientNet, VGG, and any other suitable convolutional neural networks with transfer learning.

In some embodiments, method 500 further can include an activity 520 of indexing the sample items based on the respective embedding vector of each of the sample items while or after storing the sample items to a database (e.g., database 505, which can be similar or identical to database 350 (FIG. 3) or database 380 (FIG. 3)).

In a number of embodiments, method 500 also can include an activity 530 of determining a query embedding vector (e.g., 504) for a catalog image (e.g., 502) of a query item by the neural network model (e.g., machine learning model 320 (FIG. 3)) pre-trained in activity 510. In many embodiments, activity 530 can be similar or identical to block 410 (FIG. 4).

In some embodiments, method 500 further can include an activity 540 of performing a K-NN search to determine neighboring items (e.g., 506) from among the sample items stored and indexed in the database (e.g., database 505) in activity 520, based on a respective embedding distance between the query embedding vector and the respective embedding vector of each of the neighboring items (e.g., 506). In many embodiments, activity 540 can be similar or identical to block 420 (FIG. 4) and/or block 421 (FIG. 4). In several embodiments, activity 540 can find any suitable number (e.g., 3, 5, 7, 9, 11, 13, 15, etc.) of the neighboring items (e.g., 506) from among the sample items. In some embodiments, activity 540 and the database (e.g., database 505) can be implemented based on any suitable algorithms or libraries for K-NN search and vector indexing, such as FAISS, Annoy, FENSHESE, and/or NMSLIB, etc.

In several embodiments, method 500 additionally can include an activity 550 of determining a product type (e.g., 507) of the query item according to weighted majority voting based on a respective normalized weight for each of the neighboring items (e.g., 506) based on the respective embedding distance between the catalog image (e.g., 502) and the respective image of the each of the neighboring items (e.g., 506). In many embodiments, activity 550 can be similar or identical to, or include one or more activities of, block 430 (FIG. 4), block 440 (FIG. 4), block 441 (FIG. 4), and/or block 442 (FIG. 4). In some embodiments, activity 550 can determine the respective normalized weight for each of the neighboring items (e.g., 506) based on any suitable equation, including the equation in block 430 (FIG. 4). In a number of embodiments, activity 550 further can conduct the weighted majority voting by: (a) grouping the neighboring items (e.g., 506) based on a respective product type (e.g., 507) of each of the neighboring items (e.g., 506); (b) tallying a respective weighted group vote for each group; and (c) determining a wining group based on the respective weighted group vote. In many embodiments, activity 550 further can determine the query product type of the query item based on the respective product type of the wining group.

In many embodiments, the techniques described herein can provide several technological improvements. Product labels are generally assigned manually or imported from data provided by sellers and sometimes can be incorrect. Incorrect product labels may cause a search engine to find products that are nowhere similar to what users ask for or fail to find products that users really want, which in turn can result in poor user experience and/or loss of sales. Further, product label taxonomy can evolve over time, and product labels thus can to be updated periodically. Conventional image classification systems and/or methods use image-based machine learning models trained to extract product labels based on product images and can assign product labels to products and/or find erroneous product labels. However, the result of image classification is generally not precise, and image-based machine learning models can be hard to re-train to keep up with changes in product label taxonomies. The techniques used here improve image classification systems and/or methods by using: (a) an image-based machine learning model pre-trained to extract visual features of a query item into embedding item vectors, (b) a search engine to determine visually similar products with verified product labels based on the extracted features, and (c) a weighted majority vote by the visually similar products to determine the product label(s) for the query item. Because the image-based machine learning model here is used to extract visual features, not product labels, it can accommodate taxonomy changes even without being re-trained frequently. Further, using the weighted majority vote, instead of a headcount, to determine the product label(s) provides a more accurate and fair prediction of the product label(s).

In a number of embodiments, the techniques described herein can advantageously provide a consistent user experience by correcting inconsistent search results. For example, a computer cable can be found and displayed with other sandals on a user interface when a user searches for sandals and the product type of the computer cable is incorrectly assigned.

In many embodiments, the techniques described herein can be used continuously at a scale that cannot be handled using manual techniques. For example, the number of items in a product catalog of an e-commerce site can be millions, or at least hundreds of thousands, and detecting incorrect product labels of the millions of items cannot be timely handled by humans before at least some of the hundreds or thousands of users of the e-commerce site encounter erroneous search results.

In a number of embodiments, the techniques described herein can solve a technical problem that arises only within the realm of computer systems, as e-commerce and online product catalogs do not exist outside the realm of computer networks. Moreover, the techniques described herein can solve a technical problem that cannot be solved outside the context of computer networks. Specifically, the techniques described herein cannot be used outside the context of computer networks, in view of the embedding vectors for item images, the machine learning model, the neural network model, and/or the search engine used in the systems, methods, and techniques described herein.

Various embodiments can include a system including one or more processors and one or more non-transitory computer-readable media storing computing instructions configured to run on the one more processors and perform certain acts. The acts can include determining neighboring items from among sample items based on a respective embedding distance between a query image of a query item and a respective image of each of the neighboring items. The each of the sample items can comprise the respective image and at least one respective item label. The acts additionally can include determining a respective normalized weight for each of the neighboring items based on the respective embedding distance between the query image and the respective image of the each of the neighboring items. The acts further can include determining a query item label of the query item based on a weighted majority vote by the neighboring items via the respective normalized weight for the each of the neighboring items.

Various embodiments can include a method being implemented via execution of computing instructions configured to run at one or more processors and stored at one or more non-transitory computer-readable media. The method can include determining neighboring items from among sample items based on a respective embedding distance between a query image of a query item and a respective image of each of the neighboring items. The each of the sample items can comprise the respective image and at least one respective item label. The method further can include determining a respective normalized weight for each of the neighboring items based on the respective embedding distance between the query image and the respective image of the each of the neighboring items. Moreover, the method can include determining a query item label of the query item based on a weighted majority vote by the neighboring items via the respective normalized weight for the each of the neighboring items.

Although systems and methods for determining an item label based on an item image have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIGS. 4 and 5 may include different procedures, processes, and/or activities and be performed by many different modules, in many different orders, and/or one or more of the procedures, processes, or activities of FIGS. 4-5 may include one or more of the procedures, processes, or activities of another different one of FIGS. 4-5. As another example, the elements, modules, models, or systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
automatically determining, by a machine learning model trained based at least in part on sample items stored in a sample database, a query embedding vector for a query image of a query item;
determining, based on a respective embedding distance between the query image of the query item and a respective image of each of the sample items, neighboring items from among the sample items, wherein:
the respective embedding distance is calculated based on the query embedding vector for the query image and a respective embedding vector for the respective image of each of the sample items; and
each of the sample items comprises the respective image and at least one respective item label;
determining a respective normalized weight for each of the neighboring items based on the respective embedding distance between the query image and the respective image of the each of the neighboring items;
determining a query item label of the query item based on a weighted majority vote by the neighboring items via the respective normalized weight for the each of the neighboring items;
upon determining that the query item label of the query item is different from a first item label of the query item, storing the query item with the query item label in a product database;
selectively updating the sample items stored in the sample database from items in the product database; and
re-training the machine learning model based at least in part on the sample items in the sample database, as updated.

2. The system in claim 1, wherein:
the computing instructions, when executed on the one or more processors, further cause the one or more processors to perform:
- before retrieving the sample items:
  - selectively determining a new sample image associated with at least one new image label for a new sample item of the sample items, wherein:
    - the respective image of the new sample item comprises the new sample image; and
    - the at least one respective item label of the new sample item comprises the at least one new image label;
  - determining the respective embedding vector for the new sample item; and
  - storing the new sample item in the sample database.

3. The system in claim 1, wherein:
determining the neighboring items further comprises using a k-nearest neighbors (K-NN) search engine to search for the neighboring items for the query item.

4. The system in claim 1, wherein:
the respective embedding distance between the query image and the respective image of the each of the neighboring items is a Euclidean distance between the query embedding vector for the query image and the respective embedding vector of the each of the neighboring items.

5. The system in claim 1, wherein:
the machine learning model further comprises a neural network model.

6. The system in claim 5, wherein:
the computing instructions, when executed on the one or more processors, further cause the one or more processors to perform:
- before determining automatically the query embedding vector, training the neural network model based at least in part on the respective image and the at least one respective item label of the each of the sample items.

7. The system in claim 1, wherein:
determining the respective normalized weight for the each of the neighboring items further comprises calculating the respective normalized weight by:

$$\frac{\exp(d_i)}{\Sigma_j \exp(d_j)}, \forall i \in [K]$$

wherein:
- $d_i$: the respective embedding distance between the query image and its i-th neighbor; and
- K: the neighboring items.

8. The system in claim 1, wherein:
determining the query item label of the query item based on the weighted majority vote further comprises:
- tallying at least one respective weighted group vote from each group of one or more groups of the neighboring items by summing up the respective normalized weight for each of one or more respective items of the each group of the one or more groups, wherein:
  - the neighboring items comprise the one or more respective items; and
  - the at least one respective item label of the each of the one or more respective items is identical within the each group; and
- determining the query item label of the query item to be the at least one respective item label of each of the one or more respective items of a wining group of the one or more groups based on the at least one respective weighted group vote from the wining group.

9. The system in claim 1, wherein:
the computing instructions, when executed on the one or more processors, further cause the one or more processors to perform:
- upon determining that a designation error exists and before storing the query item in the product database, transmitting an alert to a user to be displayed on a user interface executed on a user device for the user based at least in part on the designation error.

10. The system in claim 9, wherein:
the computing instructions, when executed on the one or more processors, further cause the one or more processors to perform:
- before transmitting the alert to the user, determining a confidence level status based on whether a confidence level for the query item label is at least as great as a predetermined threshold; and
- transmitting the alert to the user further comprises transmitting the alert to the user further based on the confidence level status.

11. A method being implemented via execution of computing instructions configured to run at-one or more processors and stored at one or more non-transitory computer-readable media, the method comprising:
- automatically determining, by a machine learning model trained based at least in part on sample items stored in a sample database, a query embedding vector for a query image of a query item;
- determining, based on a respective embedding distance between the query image of the query item and a respective image of each of the sample items, neighboring items from among the sample items, wherein:
  - the respective embedding distance is calculated based on the query embedding vector for the query image and a respective embedding vector for the respective image of each of the sample items; and
  - each of the sample items comprises the respective image and at least one respective item label;
- determining a respective normalized weight for each of the neighboring items based on the respective embedding distance between the query image and the respective image of the each of the neighboring items;
- determining a query item label of the query item based on a weighted majority vote by the neighboring items via the respective normalized weight for the each of the neighboring items;
- upon determining that the query item label of the query item is different from a first item label of the query item, storing the query item with the query item label in a product database;
- selectively updating the sample items stored in the sample database from items in the product database; and
- re-training the machine learning model based at least in part on the sample items in the sample database, as updated.

12. The method in claim 11, further comprising:
before retrieving the sample items:
- selectively determining a new sample image associated with at least one new image label for a new sample item of the sample items, wherein:
  - the respective image of the new sample item comprises the new sample image; and the at least one respective item label of the new sample item comprises the at least one new image label;
determining the respective embedding vector for the new sample item; and
storing the new sample item in the sample database.

13. The method in claim 11, wherein:
determining the neighboring items further comprises using a k-nearest neighbors (K-NN) search engine to search for the neighboring items for the query item.

14. The method in claim 11, wherein:
the respective embedding distance between the query image and the respective image of the each of the neighboring items is a Euclidean distance between the query embedding vector for the query image and the respective embedding vector of the each of the neighboring items.

15. The method in claim 11, wherein:
the machine learning model further comprises a neural network model.

16. The method in claim 15, further comprising, before determining automatically the query embedding vector:
training the neural network model based at least in part on the respective image and the at least one respective item label of the each of the sample items.

17. The method in claim 11, wherein:
determining the respective normalized weight for the each of the neighboring items further comprises calculating the respective normalized weight by:

$$\frac{\exp(d_i)}{\Sigma_i \exp(d_i)}, \forall\, i \in [K]$$

wherein:
$d_i$: the respective embedding distance between the query image and its i-th neighbor; and
K: the neighboring items.

18. The method in claim 11, wherein:
determining the query item label of the query item based on the weighted majority vote further comprises:
tallying at least one respective weighted group vote from each group of one or more groups of the neighboring items by summing up the respective normalized weight for each of one or more respective items of the each group of the one or more groups, wherein:
the neighboring items comprise the one or more respective items; and
the at least one respective item label of the each of the one or more respective items is identical within the each group; and
determining the query item label of the query item to be the at least one respective item label of each of the one or more respective items of a wining group of the one or more groups based on the at least one respective weighted group vote from the wining group.

19. The method in claim 11, further comprising:
upon determining that a designation error exists and before storing the query item in the product database, transmitting an alert to a user to be displayed on a user interface executed on a user device for the user based at least in part on the designation error.

20. The method in claim 19, further comprising:
before transmitting the alert to the user, determining a confidence level status based on whether a confidence level for the query item label is at least as great as a predetermined threshold,
wherein:
transmitting the alert to the user further comprises transmitting the alert to the user further based on the confidence level status.

* * * * *